United States

Mailer

[11] 3,799,643
[45] Mar. 26, 1974

[54] LASER SPATIAL COHERENCE COMPENSATION IN HOLOGRAPHY

[75] Inventor: Hugh Mailer, Columbus, Ohio

[73] Assignee: Holotron Corporation, Wilmington, Del.

[22] Filed: Sept. 9, 1968

[21] Appl. No.: 758,564

[52] U.S. Cl. ................................. 350/3.5
[51] Int. Cl. ........................... G02b 27/00
[58] Field of Search ..................... 350/3.5

[56] References Cited
UNITED STATES PATENTS
3,580,655  5/1971  Leith et al. ................... 350/162

OTHER PUBLICATIONS
Brooks et al., Applied Physics Letters, Vol. 7 No. 4, pp. 92–94 (8/1965).

Leith et al., J. Opt. Soc. Am., Vol. 56 No. 4, p. 523 (4/1966).

Primary Examiner—Ronald L. Wibert
Assistant Examiner—Ronald J. Stern
Attorney, Agent, or Firm—Woodcock, Washburn, Kurtz & Mackiewicz

[57] ABSTRACT

A compensating technique for use with a high-powered laser light source having an output with a plurality of transverse modes is disclosed which utilizes a diffusive medium placed between the laser and an object scene for constructing a hologram in an otherwise conventional manner.

19 Claims, 3 Drawing Figures

LASER SPATIAL COHERENCE COMPENSATION IN HOLOGRAPHY

BACKGROUND OF THE INVENTION

This invention relates generally to off-axis holography and more specifically relates to improvements in high-intensity or pulsed laser holography.

Recent improvements in methods of wavefront reconstruction holography by Leith and Upatnieks may be found disclosed in the literature and are also described and claimed in copending patent application Ser. No. 361,977, filed Apr. 23, 1964 now U.S. Pat. No. 3,506,327. Briefly, this improved holographic technique utilizes an object beam of electromagnetic energy striking an object scene and a hologram detector is placed to receive an object modified beam. A reference beam of electromagnetic energy coherent with the object beam is directed upon the hologram detector for interference with the object modified beam and at a finite angle therewith. The usual application of this technique is in the optical domain and the hologram detector is usually photographic film but may be some other medium, such as photochromic glass. The film is exposed to the interference pattern which is recorded thereon and after development in the normal manner the object modified beam wavefront may be reconstructed by illuminating the film with a light source having characteristics similar to the reference beam used in constructing the hologram. This reconstructed wavefront may be used to view an image of the original object scene which appears to the observer to be as if the object scene was present in all its three-dimensional characteristics.

A laser light source is preferably used in the construction of a hologram because of its good temporal and spatial coherence. The ideal laser for holography is one with a single mode output. That is, the ideal laser would have a single longitudinal mode for temporal coherence and the lowest order transverse mode for spatial coherence. The presence of a number of longitudinal modes in a laser light output leads to a reduction in the depth of field of the reconstructed object scene. The presence of a number of transverse modes in a laser light output results in a coarse or spotted reconstructed image.

In order to approach the characteristics of the ideal laser, mode control of both longitudinal and transverse components is necessary. Exemplary techniques for longitudinal mode control are described by Jacobson and McClung in Applied Optics, November, 1965, Vol. 4, No. 11, page 1,509, and by Fritzler and Marom in Applied Physics Letters, July 1, 1967, Vol. 11, No. 1, page 16. The Fritzler and Marom paper recognizes that pulsed laser spatial coherence will have to be improved by transverse mode selection in order to improve the quality of the reconstructed image. Jacobson and McClung describe aperturing techniques within the laser to select the lowest order transverse mode for the laser output beam. However, a transverse mode selection technique sacrifices output power of the laser which is a serious disadvantage in most holographic applications.

A technique wherein the light output is not reduced is one where a laser output having a plurality of transverse modes is utilized in its entirety with compensation for the resulting laser spatial incoherence. One specific method for implementing this approach is disclosed by Brooks et al in IEEE Journal of Quantum Electronics, Vol. QE-2, No. 8, August 1966, page 275. This paper suggests an optical system for use in constructing a hologram that brings both the reference and object beams into precise superposition upon the photographic film to compensate for spatial incoherency in the laser beam. This method of compensation is very difficult to carry out because of the precise alignment of optical elements which is required, and also results in a loss of flexibility which may be desired in the hologram construction geometry. Furthermore, because of the exact object and reference beam superposition required, diffusely reflecting objects cannot be made the subject of such a hologram.

It is, therefore, an object of this invention to provide an improved technique for compensating for spatial incoherence of a laser light source for use in holography.

It is a further object of this invention to provide a flexible technique to compensate for a multi-transverse mode output of high-powered laser light source for use with diffusely opaque as well as transparent object scenes.

SUMMARY OF THE INVENTION

These and additional objects are realized by this invention wherein the object beam is diffused in a manner to illuminate all lighted portions of the object scene with radiation of every transverse mode in a multi-transverse mode laser light beam. Light reflected from or transmitted through each point of an object scene will then be recorded at every point on the hologram. This technique utilizes the multi-transverse mode intensity output of a high-powered laser in making a hologram that is capable of reconstructing an image which is a complete rendition of the object scene.

For a more detailed disclosure of the invention and for further objects and advantages thereof, reference should be made to the following description taken in conjunction with the accompanying drawings.

DETAILED DESCRIPTION OF THE PREFERRED EMBODIMENT

Figure 1:
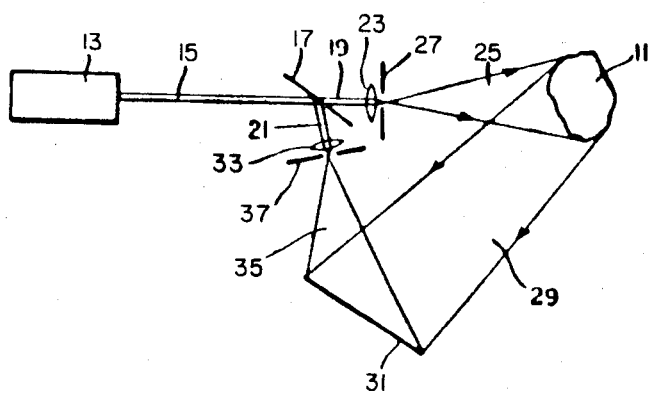
FIG. 1 illustrates a typical optical arrangement used for constructing a hologram according to the off-axis technique.

With reference to FIG. 1, a typical optical arrangement for making a hologram of an object scene 11 is illustrated. A gas continuous wave laser light source 13 typically emits a narrow pencil light beam 15 incident upon a beam divider 17 which results in two light beams 19 and 21. The light beam 19 is passed through a lens 23 in order to diverge it into an object beam 25 which may illuminate the entire object scene 11. A pinhole spatial filter 27 is placed at the focal plane of the lens 23 to block undesired components of the wavefront passing through the lens. An object bearing, or modified, beam 29 is reflected from the object scene 11 onto a photographic film 31. The light beam 21 is passed through a lens 33 in order to produce a reference beam 35 which is wide enough to cover the full area of the photographic film 31 and to thereby interfere with the object bearing beam 29 over this area. A pinhole spatial filter 37 is placed at the focal plane of the lens 33 to block undesired components of the reference wavefront from the film. It is the interference pattern between reference beam 35 and the object bearing beam 29 that is recorded on the photographic film 31. When this film is developed in a normal manner, the object bearing wavefront 29 may be reconstructed by illuminating the film with a light source having characteristics similar to that of the reference beam 35. An image of the object scene 11 will appear to the observer as if he were observing the object scene itself, with full three-dimensionality and parallax effects.

Both the object beam 25 and the reference beam 35 should each be a spatially coherent as possible. To be spatially coherent means that the relative phase of the light waves across each beam wavefront remains constant as a function of time. If the relative phase across the beam is changing with time, at least a portion of the object bearing beam 29 and the reference beam 35 will not produce an interference pattern at the photographic film 31 for recording thereon. Therefore, some information of the object scene 11 will be lost, which results in a reconstructed image that is not a complete rendition of the object scene. To obtain such spatial coherence, the laser light beam 15 is generally a low power level as a result of some transverse mode control within the laser 13, as hereinbefore discussed. Also improving the spatial coherence of the beams 25 and 35 are the pinhole filters 27 and 37, but this external aperturing also causes loss of light power. As an alternative to low power laser operation, a multi-transverse mode light output may be utilized by compensating therefor, as hereinabove discussed with reference to the Brooks et al article, so that the relative phase change across the reference beam 35 as it impinges upon the photographic film 31 is the same as the relative phase change of the object bearing beam 29 across the film. This superposition of reference and object bearing beams is very difficult to accomplish and cannot be accomplished for opaque object scenes (especially if diffused) such as illustrated in FIG. 1. These disadvantages are overcome by the techniques of this invention.

Figure 2:
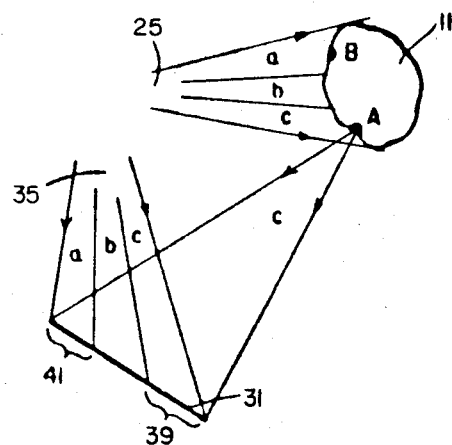
FIG. 2 illustrates the problem of constructing a hologram with a multi-transverse mode laser light source.

The problem of using a laser light source without transverse mode compensation in constructing a hologram is best illustrated by reference to FIG. 2. The object beam 25 is shown to have three transverse modes, $a$, $b$ and $c$, as an example, but it is understood that the principles of this invention apply to two or any higher number of distinct transverse modes. Since the same laser light source is used for the reference beam 35, it is made up of the same spatially distinct modes. Point A of the object scene 11, as an example, is shown to be illuminated only by light of the $c$ transverse mode. This point will radiate light only of this transverse mode which will then impinge upon the photographic film 31. The desired interference with the reference beam 35 will occur only at the portion 39 of the photographic film 31 and information as to the object point A is recorded only on this portion of the film. The $c$ transverse mode will not interfere with either the $a$ or $b$ transverse modes with effectiveness to record information concerning this point of the object scene on other portions of the film. The same situation exists for other points of the object scene, such as for a point B which is illuminated with the object beam portion in the $a$ transverse mode. Information as to point B will be recorded only on a portion 41 of the photographic film 31. A hologram so constructed will produce a patchy reconstructed image of the object scene without the full viewing aperture that would be obtained if information as to all points of the object scene were recorded over the entire photographic film.

Figure 3:
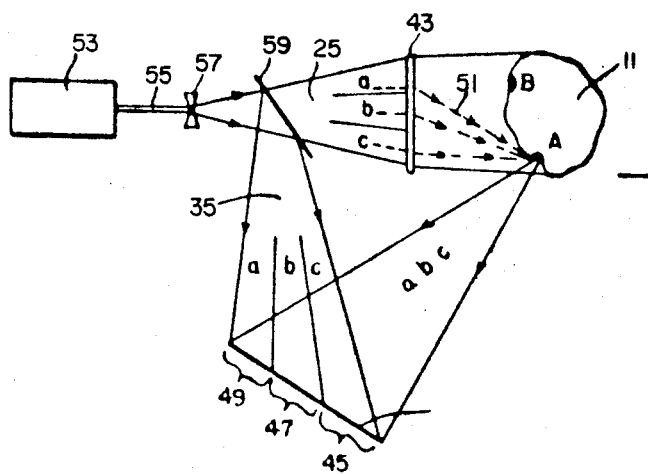
FIG. 3 illustrates the compensating technique for a multi-transverse mode laser light beam of this invention.

To overcome these difficulties without having to restrict useful laser light output to a single transverse mode, the object beam 25 is diffused sufficiently over the object 11 so that all points of the object to be recorded are illuminated with light radiation of each of the transverse modes. Referring to FIG. 3, a dispersion medium 43 is placed in the path of the multi-transverse mode object beam 25 to accomplish this object illumination. Therefore point A, as an example, will be illuminated by all three transverse modes and will thus irradiate these modes outwardly onto the photographic film 31. In the area 45 of the photographic film, the $c$ transverse mode will interfere with the reference beam 35 to record in that area information as to the point A of the object scene 11. In the area 47 of the film, the $b$ transverse mode will produce an interference to record in that area information as to the point A. In the area 49 of the film, the $a$ mode will interfere to record information as to the point A. Therefore, information of the point A is recorded over all of the photographic film 31. Exposure of the film by non-interfering transverse modes being reflected from the object will fog the film, but the effect of this fogging can be minimized. For instance, bleaching the film after development will compensate for this fogging by increasing transmission of the film. An image is reconstructed from the finished hologram as in ordinary holography and will be a complete rendition of the object scene substantially as if the hologram has been constructed with a laser beam having only a single transverse mode in the conventional manner according to the technique of FIG. 1.

The diffusive medium 43 may be any one of a number of devices that diffuses light incident upon it and is preferably a piece of opal glass (milk white) or a ground glass diffusion plate formed by etching or other means. This plate must have a sufficient bending power of light and must be placed far enough away from the object scene 11 to illuminate substantially equally all points on the object with light from all portions of the object beam 25. For instance, light rays from the $a$ transverse mode must be bent at an angle sufficient to cover the entire object, such as illustrated by ray 51 which illuminates the point A of the object. Similarly, rays from other transverse modes must be bent to illuminate the entire object.

The above-described mode compensation technique has a beneficial application with a pulsed solid state laser such as a pulsed ruby laser. This type of laser is used where a higher intensity light beam is needed for a specific holography application than is available from a continuous wave gas laser. Therefore, presently used transverse mode selection techniques which reduce the output intensity of a pulsed ruby laser in order to obtain spatial coherence are undesirable. The transverse mode compensation techniques of this invention are preferred, since they maintain output power of the laser.

In FIG. 3, a high-powered pulsed solid-state laser 53 emits a narrow light beam 55 which is caused to diverge by a negative lens 57. A beam splitter 59 divides the intensity of this beam into the object beam 25 and the reference beam 35. It may also be noted that the use of positive lenses 23 and 33 along with pinhole filters 27 and 37 in the gas laser configuration of FIG. 1 cannot generally be used with a high-powered solid-state pulsed laser since the energy concentration will ionize the surrounding air and burn out the pinhole filters. Therefore, this external means of transverse mode selection is not available with such a laser and thus makes the techniques of this invention very advantageous.

It shall be understood that the invention is not limited to the specific arrangements shown, and that changes and modifications may be made within the scope of the invention as defined in the appended claims.

What is claimed is:

1. A method of constructing a hologram of an opaque diffusely reflecting object scene, comprising the steps of:
   directing a light beam having a plurality of transverse modes toward an opaque diffusely reflecting object scene from a laser light source,
   diffusing the light beam in a manner to illuminate all the lighted portions of the object scene with radiation of all transverse modes present in the beam,
   placing a hologram detector to receive the object modified light beam reflected from the object scene, and
   directing a reference light beam from the laser onto the detector for interference with the object modified beam, whereby a hologram is constructed.

2. A method according to claim 1 wherein the step of diffusing the light beam includes placing a diffusive medium in the light beam between the laser and the object scene.

3. A method according to claim 1 wherein the step of diffusing the light beam includes placing an opal glass diffusive medium in the light beam between the laser and the object scene.

4. A method according to claim 1 wherein the step of diffusing the light beam includes placing a ground glass diffusive medium in the light beam between the laser and the object scene.

5. A method according to claim 1 wherein the step of placing a hologram detector includes placing a photographic film in the light beam after modification by the object scene.

6. A method according to claim 1 wherein the step of directing a light beam from a laser includes pulsing a solid state laser to produce the light beam.

7. Apparatus for constructing a hologram of an opaque diffusely reflecting object scene, comprising:
   a laser light source having a light beam ouput with a plurality of transverse modes,
   a hologram detector,
   means for directing a portion of the intensity of said beam onto said opaque diffusely reflecting object scene for reflection therefrom as an object modified beam onto said detector and for diverting another portion of the intensity of said beam directly onto said detector as a reference beam for interference with the object modified beam, and
   means in the object beam between said laser and said object scene for diffusing said object beam so that substantially all illuminated points of the object scene are each illuminated by every transverse mode of said laser light output.

8. Apparatus according to claim 7 wherein said means for diffusing the laser light beam includes ground glass.

9. Apparatus according to claim 7 wherein said means for diffusing the laser light beam includes opal glass.

10. Apparatus according to claim 7 wherein said hologram detector includes photographic sensitive film.

11. Apparatus according to claim 7 wherein said laser light source includes a pulsed solid state laser.

12. Apparatus according to claim 7 wherein said laser light source includes a pulsed ruby laser.

13. A method of producing an image of an opaque diffusely reflecting object scene, comprising the steps of:
   directing a light beam having a plurality of transverse modes toward an opaque diffusely reflecting object scene from a laser light source,
   diffusing the light beam in a manner to illuminate all the lighted portions of the object scene with radiation of all transverse modes present in the beam,
   placing a hologram detector to receive the object modified light beam reflected by the object scene,
   directing a reference light beam from the laser onto the detector for interference with the object modified beam, and
   illuminating the hologram detector with light radiation in a manner to reconstruct an image of the object scene.

14. In a method of constructing an off-axis hologram with a coherent light beam having a plurality of transverse modes in which a portion of the light beam intensity illuminates an object scene to produce an object modified beam and the remaining portion of the light beam intensity directly illuminates as a reference beam a photosensitive hologram detector positioned in the path of the object modified beam, said reference beam illuminating at least one area of the hologram detector with light of less than all of the plurality of transverse modes present in said coherent light beam, the improvement which includes illuminating the object scene in a manner that substantially all illuminated points thereof receive light of each of said plurality of transverse modes from said coherent light beam, and wherein at least a portion of the object scene is characterized by its illuminated portion being diffusely reflective and wherein the object modified beam is formed by reflection of the object illumination from the object scene.

15. A holographic apparatus having improved spatial coherence and uniform amplitude distribution comprising:
   a. a solid laserable material;
   b. means for pumping said laserable material into an excited stage;
   c. a resonant cavity enclosing said laserable material to cause the generation of a pulse of a substantially monochromatic, coherent light beam;
   d. a mode selector in said cavity for permitting a light pulse of substantially a single frequency to be built up, while providing substantially no transverse mode selection;
   e. optical means for splitting said light beam into a scene beam and a reference beam;
   f. a recording material disposed in a predetermined plane for recording a hologram of a diffusely reflecting object wherein the object is positioned to reflect light from said scene beam to the recording material;

g. means for reflecting said reference beam onto said recording material; and h. a light diffuser interposed into the path of said scene beam for diffusing the scene beam in a manner to illuminate all the lighted portions of the object with radiation of all transverse modes present in said light beam pulse, whereby the object in the path of said scene beam reflects and diffuses said scene beam onto said recording material, said object operating as an additional light diffuser.

16. A holographic apparatus having spatial coherence compensation and uniform amplitude distribution comprising:

a solid state laser capable of generating a light beam pulse of substantially a single frequency, said laser including a longitudinal mode selecting means while providing substantially no transverse mode selection, whereby said light beam pulse contains a plurality of transverse modes;

optical means for splitting said light beam into a scene beam and a reference beam;

a recording material disposed in a predetermined plane to receive the reference beam for recording a hologram of a diffusely reflecting object, wherein the object is positioned to reflect light from said scene beam to the recording material; and a light diffuser interposed into the path of said scene beam for diffusing the scene beam in a manner to illuminate all the lighted portions of the object with radiation of all transverse modes present in said light beam pulse, whereby the object in the path of said scene beam reflects and diffuses said scene beam onto said recording material, said object operating as an additional light diffuser.

17. Apparatus for constructing a hologram of a diffusely reflecting opaque object scene with a light source having poor spatial coherence, comprising:

a laser light source having a light beam output with a plurality of transverse modes, means for directing a portion of the intensity of said laser light beam onto said diffusely reflecting object scene for reflection therefrom as an object modified beam, a hologram detector positioned in the path of said object modified beam, means for diverting another portion of the intensity of said laser light beam directly onto said detector as a reference beam for interference with the object modified beam, and means in the object beam between said laser and said object scene for diffusing said object beam so that substantially all illuminated points of the object scene are each illuminated by every transverse mode of said laser light output.

18. Apparatus according to claim 17 wherein said laser light source includes a pulsed solid state laser.

19. A holographic apparatus having spatial coherence compensation and uniform amplitude distribution comprising:

a solid state laser capable of generating a light beam pulse of substantially a single frequency, said laser including substantially no transverse mode selection, whereby said light beam pulse contains a plurality of transverse modes;

optical means for splitting said light beam into a scene beam and a reference beam;

a recording material disposed in a predetermined plane to receive the reference beam for recording a hologram of a diffusely reflecting object, wherein the object is positioned to reflect light from said scene beam to the recording material; and a light diffuser interposed into the path of said scene beam for diffusing the scene beam in a manner to illuminate all the lighted portions of the object with radiation of all transverse modes present in said light beam pluse, whereby the object in the path of said scene beam reflects and diffuses said scene beam onto said recording material, said object operating as an additional light diffuser.

* * * * *